(12) United States Patent
Beraudier et al.

(10) Patent No.: US 10,073,813 B2
(45) Date of Patent: Sep. 11, 2018

(54) GENERATING A MIXED INTEGER LINEAR PROGRAMMING MATRIX FROM AN ANNOTATED ENTITY-RELATIONSHIP DATA MODEL AND A SYMBOLIC MATRIX

(75) Inventors: Vincent Beraudier, Grasse (FR); Georges-Henri Moll, Villeneuve-Loubet (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 821 days.

(21) Appl. No.: 13/243,928

(22) Filed: Sep. 23, 2011

(65) Prior Publication Data
US 2013/0060728 A1 Mar. 7, 2013

(30) Foreign Application Priority Data

Sep. 6, 2011 (EP) .................... 11290399

(51) Int. Cl.
*G06F 17/11* (2006.01)
(52) U.S. Cl.
CPC .................... *G06F 17/11* (2013.01)
(58) Field of Classification Search
CPC ........ G06N 5/022; G06N 5/04; G06N 99/005; G06N 5/02; G06F 17/00
USPC ....................... 706/50, 46, 45, 62
See application file for complete search history.

(56) References Cited

U.S. PATENT DOCUMENTS

| | | |
|---|---|---|
| 4,796,194 A | 1/1989 | Atherton |
| 5,233,513 A | 8/1993 | Doyle |
| 5,343,388 A | 8/1994 | Wedelin |
| 5,524,077 A | 6/1996 | Faaland et al. |
| 6,892,192 B1 | 5/2005 | Geddes et al. |
| 7,460,549 B1 | 12/2008 | Cardei et al. |
| 2003/0033236 A1* | 2/2003 | Davenport et al. ............. 705/37 |
| 2003/0105868 A1 | 6/2003 | Kimbrel et al. |
| 2003/0233273 A1 | 12/2003 | Jin et al. |
| 2004/0054564 A1 | 3/2004 | Fonseca et al. |
| 2004/0138950 A1 | 7/2004 | Hyman et al. |
| 2004/0172321 A1 | 9/2004 | Vemula et al. |
| 2005/0027577 A1 | 2/2005 | Saeed |

(Continued)

OTHER PUBLICATIONS

Bisschop et al, "AIMMS the Language Reference", AIMMS 3.1 May 31, 2000, Paragon Decision Technology B.V.*

(Continued)

*Primary Examiner* — Paulinho E Smith
(74) *Attorney, Agent, or Firm* — Marcia L. Doubet

(57) ABSTRACT

Programmatically generating a mixed integer linear programming ("MIP") matrix, which can then be solved to provide an optimization, based on an annotated entity/relationship data model and a symbolic matrix. The annotated data model identifies one or more outputs of the optimization. The symbolic matrix provides one or more constraints that provide requirements under which the optimization is solved. Outputs of the optimization are represented as variables, inputs of the optimization are represented as constants, and primary keys from the data model are represented as indexes. The constraints are expressed using the variables, constants, and indexes. A MIP matrix is generated from the symbolic matrix, and is then solved by a MIP solver. The output of the MIP solver is used to update a corresponding data structure of the data model.

10 Claims, 17 Drawing Sheets

(56) References Cited

U.S. PATENT DOCUMENTS

| | | | |
|---|---|---|---|
| 2005/0033844 A1 | 2/2005 | Andrzejak et al. | |
| 2006/0049468 A1 | 3/2006 | Cheng et al. | |
| 2006/0053039 A1 | 3/2006 | Gamarnik et al. | |
| 2006/0112049 A1* | 5/2006 | Mehrotra et al. | 706/46 |
| 2007/0087756 A1 | 4/2007 | Hoffberg | |
| 2008/0062886 A1 | 3/2008 | Tang et al. | |
| 2009/0077001 A1 | 3/2009 | Macready et al. | |
| 2009/0217232 A1* | 8/2009 | Beerel et al. | 716/18 |
| 2009/0228291 A1* | 9/2009 | Rothberg et al. | 705/1 |
| 2009/0228309 A1* | 9/2009 | Moll | 705/7 |
| 2010/0161289 A1 | 6/2010 | Stojanovic et al. | |
| 2011/0270646 A1* | 11/2011 | Prasanna et al. | 705/7.27 |
| 2011/0307327 A1* | 12/2011 | Bixby et al. | 705/14.43 |

OTHER PUBLICATIONS

"Gurobi Optimization Pushing the Frontiers of Optimization Performance", Jun. 18, 2010, 2010 Gurobi Optimization.*

Holmstrom et al, "User'S Guide for Tomlab /Gurobi", Tomlab Optimization, Nov. 18, 2009.*

Makhorin,"GNU Linear Programming Kit Reference Manual Version 4.38", May 2009.*

Simonis, "Finite Domain Constraint Programming Methodology", Constraint Methodology, COSYTEC Complex Systems Technologies, Feb. 27, 2008.*

Georges-Henri Moll, U.S. Appl. No. 11/635,250, filed Dec. 5, 2006, Office Action, dated Sep. 14, 2010, 7 pages.

Georges-Henri Moll, U.S. Appl. No. 11/635,250, filed Dec. 5, 2006, Office Action, dated Mar. 2, 2011, 9 pages.

Georges-Henri Moll, U.S. Appl. No. 11/635,250, filed Dec. 5, 2006, Office Action, dated Jul. 13, 2011, 11 pages.

* cited by examiner

| Col1 | Col2 |
|------|------|
| A | 4.1 |
| B | 4.3 |
| C | 5.8 |
| D | 6 |
| E | 7.6 |
| F | 7.5 |
| G | 7.3 |
| H | 6.9 |
| I | 7.3 |

LEGEND:
Col1: AlloyID
Col2: CostPerKg

| Col1 | Col2 |
|------|------|
| lead | 30 |
| zinc | 30 |
| tin | 40 |

LEGEND:
Col1: MetalID
Col2: PercentageToBuild

FIG. 4C

| | Col1 | Col2 | Col3 |
|---|---|---|---|
| 440 | | | |
| 441 | A | Lead | 10 |
| 442 | A | Zinc | 10 |
| 443 | A | Tin | 80 |
| | B | Lead | 10 |
| | B | Zinc | 30 |
| | B | Tin | 60 |
| | C | Lead | 40 |
| | C | Zinc | 50 |
| | C | Tin | 10 |
| | D | Lead | 60 |
| | D | Zinc | 30 |
| | D | Tin | 10 |
| | E | Lead | 30 |
| | E | Zinc | 30 |
| | E | Tin | 40 |
| | F | Lead | 30 |
| | F | Zinc | 40 |
| | F | Tin | 30 |
| | G | Lead | 30 |
| | G | Zinc | 20 |
| | G | Tin | 50 |
| | H | Lead | 50 |
| | H | Zinc | 40 |
| | H | Tin | 10 |
| | I | Lead | 20 |
| | I | Zinc | 30 |
| | I | Tin | 50 |

LEGEND:
Col1: AlloyID
Col2: MetalID
Col3: Percentage

| | |
|---|---|
| PercentageToInject(A) | DOUBLE |
| PercentageToInject(B) | DOUBLE |
| PercentageToInject(C) | DOUBLE |
| PercentageToInject(D) | DOUBLE |
| PercentageToInject(E) | DOUBLE |
| PercentageToInject(F) | DOUBLE |
| PercentageToInject(G) | DOUBLE |
| PercentageToInject(H) | DOUBLE |
| PercentageToInject(I) | DOUBLE |

| | |
|---|---|
| CostPerKg(A) | 4.1 |
| CostPerKg(B) | 4.3 |
| CostPerKg(C) | 5.8 |
| CostPerKg(D) | 6 |
| CostPerKg(E) | 7.6 |
| CostPerKg(F) | 7.5 |
| CostPerKg(G) | 7.3 |
| CostPerKg(H) | 6.9 |
| CostPerKg(I) | 7.3 |

| | |
|---|---|
| PercentageToBuild(Lead) | 30 |
| PercentageToBuild(Zinc) | 30 |
| PercentageToBuild(Tin) | 40 |

| | |
|---|---|
| Percentage(A, Lead) | 10 |
| Percentage(A, Zinc) | 10 |
| Percentage(A, Tin) | 80 |
| Percentage(B, Lead) | 10 |
| Percentage(B, Zinc) | 30 |
| Percentage(B, Tin) | 60 |
| Percentage(C, Lead) | 40 |
| Percentage(C, Zinc) | 50 |
| Percentage(C, Tin) | 10 |
| ... | |
| Percentage(I, Lead) | 20 |
| Percentage(I, Zinc) | 30 |
| Percentage(I, Tin) | 50 |

| Col1 | Col2 | Col3 |
|------|------|------|
| A | 4.1 | 0 |
| B | 4.3 | 60 |
| C | 5.8 | 0 |
| D | 6 | 40 |
| E | 7.6 | 0 |
| F | 7.5 | 0 |
| G | 7.3 | 0 |
| H | 6.9 | 0 |
| I | 7.3 | 0 |

LEGEND:
Col1: AlloyID
Col2: CostPerKg
Col3: PercentageToInject

FIG. 8

| | | Variable PercentageToInject (AlloyID) *810* | Comparator | RHS |
|---|---|---|---|---|
| C | PC *820* | 1 *821* | = *822* | 1 *823* |
| C | CA (MetalID) *830* | Percentage(AlloyID, MetalID) *831* | = *832* | PercentageToBuild (MetalID) *833* |
| O | COST *840* | CostPerKg (AlloyID) *841* | | (MIN) *843* |

Legend:
  C: Constraint
  O: Objective

FIG. 10

| | P_(A) | P_(B) | P_(C) | P_(D) | P_(E) | P_(F) | P_(G) | P_(H) | P_(I) | RHS |
|---|---|---|---|---|---|---|---|---|---|---|
| PC | 1 | 1 | 1 | 1 | 1 | 1 | 1 | 1 | 1 | 100 |
| CA(Lead) | 0.1 | 0.1 | 0.4 | 0.6 | 0.3 | 0.3 | 0.3 | 0.5 | 0.2 | 0.3 |
| CA(Zinc) | 0.1 | 0.3 | 0.5 | 0.6 | 0.3 | 0.4 | 0.2 | 0.4 | 0.3 | 0.3 |
| CA(Tin) | 0.8 | 0.6 | 0.1 | 0.1 | 0.4 | 0.3 | 0.5 | 0.1 | 0.5 | 0.4 |
| COST | 4.1 | 4.3 | 5.8 | 6 | 7.6 | 7.5 | 7.3 | 6.9 | 7.3 | (MIN) |

LEGEND:
P_(A): PercentageToInject(A)
P_(B): PercentageToInject(B)
P_(C): PercentageToInject(C)
P_(D): PercentageToInject(D)
P_(E): PercentageToInject(E)
P_(F): PercentageToInject(F)
P_(G): PercentageToInject(G)
P_(H): PercentageToInject(H)
P_(I): PercentageToInject(I)

GENERATING A MIXED INTEGER LINEAR PROGRAMMING MATRIX FROM AN ANNOTATED ENTITY-RELATIONSHIP DATA MODEL AND A SYMBOLIC MATRIX

BACKGROUND

The present invention relates to computing systems, and deals more particularly with using computing systems to generate mixed integer linear programming matrices, which can then be solved to provide an optimization.

Mixed integer programming is a type of linear programming that is widely used for solving optimization problems, which are generally combinatorial problems. A mixed integer program, commonly referred to as a "MIP", is used for an optimization problem in which some variables are integers while others are non-integers.

BRIEF SUMMARY

The present invention is directed to generating a mixed integer linear programming matrix for solving an optimization of a data model. In one aspect, this comprises: programmatically generating an index definition to represent each primary key of each of a plurality of tables in an entity-relationship data model schema that represents the data model, and programmatically generating an index object to represent each value of each primary key; programmatically generating a constant definition to represent each input field of each of the tables, and programmatically generating a constant object to represent each value of each input field; programmatically generating a variable definition to represent each output field of each of the tables, and programmatically generating a variable object to represent each value of each output field; programmatically storing, in a symbolic matrix structure, at least one constraint on an optimization, each constraint reflecting at least one of the input fields, the constants, or the output fields; programmatically generating, from the symbolic matrix and the data model, a MIP matrix; and solving the MIP matrix with a MIP solver to yield the optimization.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIGS. 4A-4C illustrates sample input data values for the tables of the sample data model, FIG. 4D illustrates sample variables created to represent output data in the example, FIGS. 4E-4G illustrates sample constants created to represent input data in the example, and FIG. 4H illustrates a database table with output values added thereto in an appended column;

FIG. 8 illustrates a sample symbolic matrix created during operation of an embodiment of the present invention, using the sample data model of FIG. 3;

FIG. 10 illustrates a sample MIP matrix created during operation of an embodiment of the present invention, using the sample data values of FIG. 4;

DETAILED DESCRIPTION

Mixed integer programming is a type of linear programming that seeks to minimize or maximize a linear function subject to one or more linear constraints. A mixed integer program, or "MIP", is an optimization problem generally of the form:

minimize f(x)

subject to G(x)=b where L≤x≤U for some or all x, integral

In this notation, x is a vector of variables, L and U are vectors of lower and upper bounds, f(x) expresses an objective for the optimization (that is, the linear function), and G(x)=b is a set of (linear) constraint expressions. Note that while the above notation "minimize f(x)" refers to an objective of minimizing the function f(x), a model may also or alternatively be used with a maximization objective. That is, the optimization problem may be "maximize f(x)" in some cases.

The simplest and most widely used form of MIP model is the Mixed Integer Linear Programming Model, commonly referred to as a "MILP". A MILP is generally of the form:

minimize $c^T x$ subject to Ax=b where L≤x≤U for some or all x, integral

In this notation, A is an n-by-m matrix, called the constraint matrix, and c is the linear objective vector. (L and U are lower and upper bounds, and x is a vector, as before.) Accordingly, a MILP is a linear program with an integrality restriction on some or all of the variables.

Other forms of MIP model include the Mixed Integer Quadratic Program ("MIQP"), Mixed Integer Quadratically Constrained Program ("MIQCP"), and Mixed Integer Non Linear Program ("MINLP").

Figure 1:
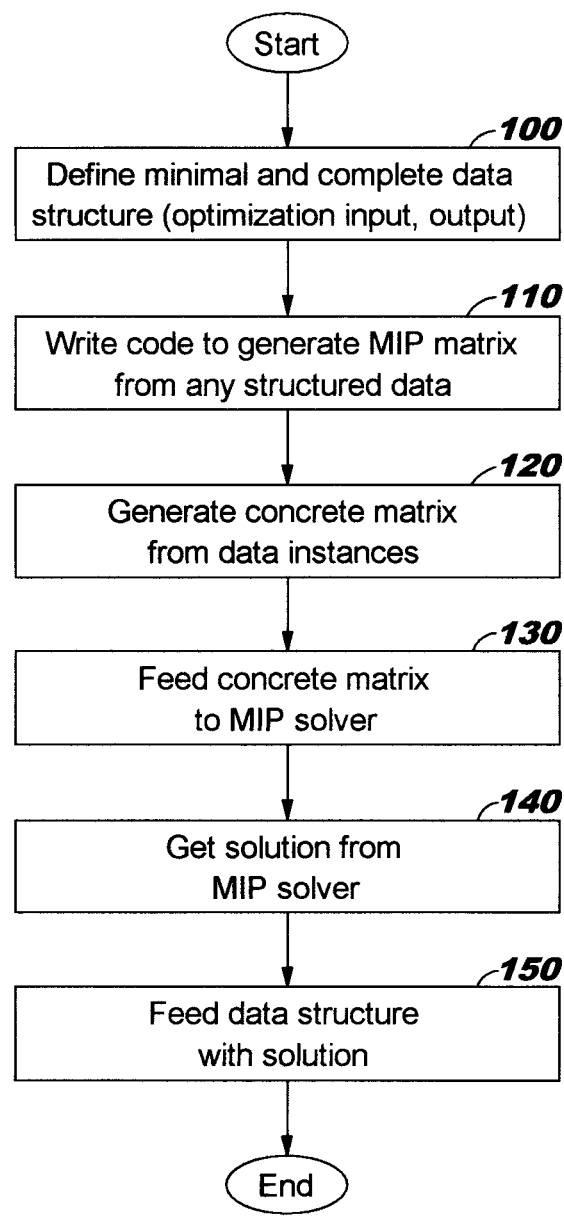
FIG. 1 illustrates a known approach used with MIP matrices.

Matrix generation is an important phase in the development of an optimization-based application, and more particularly, in the context of mixed integer programming. The general approach of known techniques is illustrated in FIG. 1, and will now be described.

A minimal and complete data structure is defined (Block 100), where this data structure defines the input and output of the optimization problem. For example, the data structure may be defined to include particular tables, which have particular columns and rows, in view of the optimization problem to be solved. (Data structures are referred to herein primarily as tables, although this is by way of illustration and not of limitation.)

Code is then manually written to generate a MIP matrix from any data in the data structure (Block 110) when using a known approach. The code is then executed to generate a concrete matrix from data instances (Block 120). The concrete matrix is fed into a MIP solver (Block 130). A number of MIP-solving software packages are known in the art, and are commercially available. Operation of such MIP-solving software packages is readily understood by those of ordinary skill in the art, and thus a detailed description of such solvers is not provided herein.

A solution for the optimization problem is thereby obtained from the MIP solver (Block 140). The solution is then fed back to the data structure (Block 150) to reflect the generated solution. Because the optimization problem is generally combinatorial in nature, the solution obtained from the MIP solver is dependent on a number of factors, and thus the processing shown in FIG. 1 may be repeated in view of different values to obtain an alternative solution for the optimization problem (i.e., a different result for the objective function represented by the MIP).

Known techniques of this type allow users to express equations for a given problem, but require a human user to provide a relatively significant amount of complex information. In particular, whereas existing solutions express the MIP using a modeling language (with or without an integrated data environment directed toward supporting that modeling language and guiding a user who is interacting therewith), the user is required to define a mapping between the modeling language and the data language of a database system that stores the data that will be used in solving the optimization problem. Developing the code for generating the MIP matrix may be beyond the skill of many users, and may be tedious and error-prone. An embodiment of the present invention, on the other hand, defines automated techniques. In particular, an embodiment of the present invention provides novel techniques for automating the processing represented by Blocks 110, 120, and 150 of FIG. 1.

Figure 2:
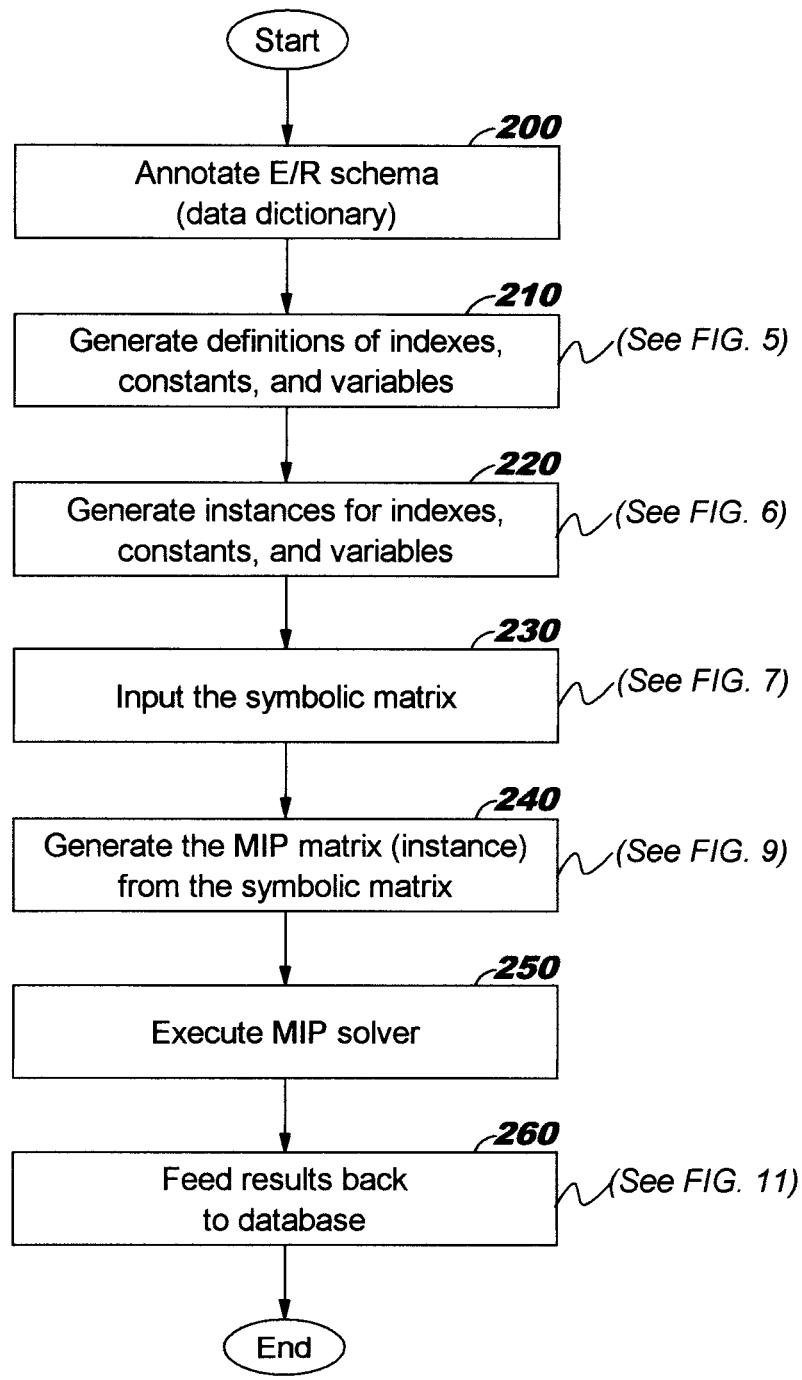
FIGS. 2, 5-7, 9, and 11 provide flowcharts depicting logic which may be used when implementing an embodiment of the present invention.

FIG. 2 provides a flowchart depicting a high-level view of operation of an embodiment of the present invention, and further details are provided in other figures. The processing that occurs according to the flowchart in FIG. 2 will be described with reference to a sample scenario where the optimization problem is directed toward determining how to combine existing metal alloys to yield a new alloy containing a predetermined combination of metals, in the least expensive combination, where the existing alloys are themselves composed of varying amounts of several metals. In particular, the objective function of the sample scenario is to minimize the total cost per kilogram of creating the new alloy, in view of a requirement that the new alloy contains a specific percentage of each of the underlying metals. In the sample scenario, the underlying metals are not directly available for creating the new alloy, and thus the optimization problem determines how to select from the existing alloys to achieve the specified percentage (while at the same time minimizing the cost). The sample scenario will be further discussed in view of the sample data model in FIG. 3 and the sample input data in FIGS. 4A-4C.

The processing in FIG. 2 begins by annotating the entity-relationship schema—sometimes referred to as a data dictionary—of the data model (Block 200). Preferably, a user performs this task, in view of his or her knowledge of the problem domain. In particular, the user preferably identifies which data values are the desired output values of the optimization. The data values are then preferably marked, or flagged, to indicate that they are output values. The output values may be selected from parameters that will have integer values as well as from parameters that have non-integer values. A type of "DOUBLE" is used herein to signify non-integer values, and refers to double-precision floating point data type.

Figure 3:
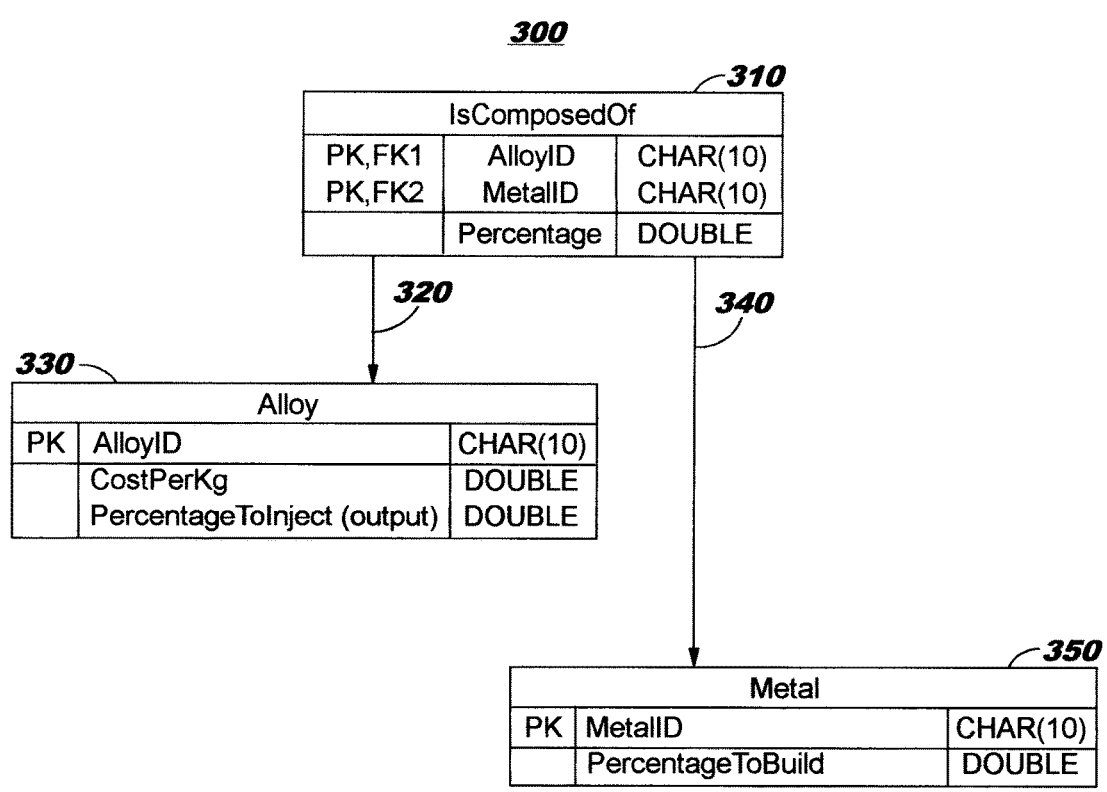
FIG. 3 illustrates tables of a sample data model which is used when describing operation of an embodiment of the present invention.

In the sample data model 300 shown in FIG. 3, the entity-relationship schema is comprised of 3 entities and relationships among them. As illustrated, the entities comprise 3 tables 310, 330, 350 and the relationships are displayed using pointers 320, 340 between the tables. These entities and relationships will now be described, by way of illustration of a data model with which an embodiment of the present invention may be used.

Table 330 stores information about various alloys of metal. Table 330 is named "Alloy" in the example data model, and uses its "AlloyID" field (which stores alloy identifiers) as a primary key. (The notation "PK" is used in FIG. 3 to denote a primary key, and "FK" is used to denote a foreign key.) The "AlloyID" field and "CostPerKg" field (which stores a cost per kilogram, for each of the alloys having an entry in table 330) are input data. In the example data model, the "AlloyID" field is defined as character data, and the "CostPerKg" field is defined as numeric, non-integer data (i.e., a double-precision data type). For the sample data model, the user identifies "PercentageToInject" as an output field (i.e., as output data of the objective function) during the annotating performed at Block 200. In the example, this field is numeric, non-integer data representing the percentage of this particular alloy that is to be injected into the new alloy that will be identified by solving the objective function. That is, a value for the "PercentageToInject" field will be inserted into each row of the Alloy table (see the discussion of Block 260, below) as a result of solving the objective function.

Table 350 stores information about metals used for creating alloys. Table 350 is named "Metal" in the example data model, and uses its "MetalID" field (which stores a metal identifier) as a primary key. In the example, the "MetalID" field is defined as character data. A "PercentageToBuild" field is defined as numeric non-integer data, and stores a value indicating the percentage of this particular metal that should be present in the new alloy. The "MetalID" field and "PercentageToBuild" field are input data in the sample data model.

Table 310 stores information, for each of the alloys, that specifies which metals the alloy is composed of and in which percentage. Table 310 is named "IsComposedOf" in the example data model, and the primary key of this table is a combination of its "AlloyID" and "MetalID" fields. Note also that these are both foreign keys, with "AlloyID" pointing 320 to the Alloy table 330 and "MetalID" pointing 340 to the Metal table 350. Table 310 also contains a non-key field "Percentage", which is numeric, non-integer data. A row in this table specifies a particular alloy, a particular one of the underlying metals which is present in that alloy, and the percentage of the particular alloy that corresponds to this particular underlying metal.

FIG. 3 uses arrows 320, 340 to visually indicate the relationships between the entity tables of the entity-relationship schema. These relationships correspond to the primary keys and foreign keys, as is understood by those of ordinary skill in the art.

FIGS. 4A-4C provide sample input data values for the data model 300. Table 400 of FIG. 4A illustrates sample data values for the Alloy table 330, as it exists before creation of the output data "PercentageToInject" that results from solving the optimization. The sample scenario uses 9 alloys, which are named by alloy identifiers "A" through "I", in the example. Accordingly, each row in table 400 of FIG. 4A lists the identifier of a different one of the 9 alloys and the corresponding cost per kilogram of that alloy.

Table 420 of FIG. 4B illustrates sample data values for the Metal table 350. The sample scenario uses 3 metals, which are lead, zinc, and tin, in the example. Accordingly, each row in table 420 of FIG. 4B lists the identifier of a different one of the 3 metals and the corresponding percentage of this metal that is required to be present in the new alloy. So, for the example, the new alloy is required to contain 30 percent lead, 30 percent zinc, and 40 percent tin.

Table 440 of FIG. 4C illustrates sample data values for the IsComposedOf table 310. Because the sample scenario uses 9 alloys and 3 metals, table 440 contains (9×3)=27 rows. The rows at reference numbers 441-443, for example, all pertain to the alloy "A". Row 441 specifies that alloy A contains 10 percent lead, whereas rows 442 and 443 specify that this alloy contains 10 percent zinc and 80 percent tin, respectively.

Note that while the existing alloy E is already composed of the desired percentages of the underlying metals, this existing alloy has the highest cost per kilogram, in the example, at 7.6 units of whatever unit measures the cost. Therefore, the problem is not solved by simply choosing to use existing alloy E as the new alloy. Similarly, while existing alloy A has the lowest cost per kilogram, at 4.1 units, this existing alloy is not composed of the required percentages of the underlying metals (as discussed above with reference to rows 441-443 of table 440 of FIG. 4C). The optimization problem is therefore not solved by simply choosing the lowest-cost alloy.

Figure 5:
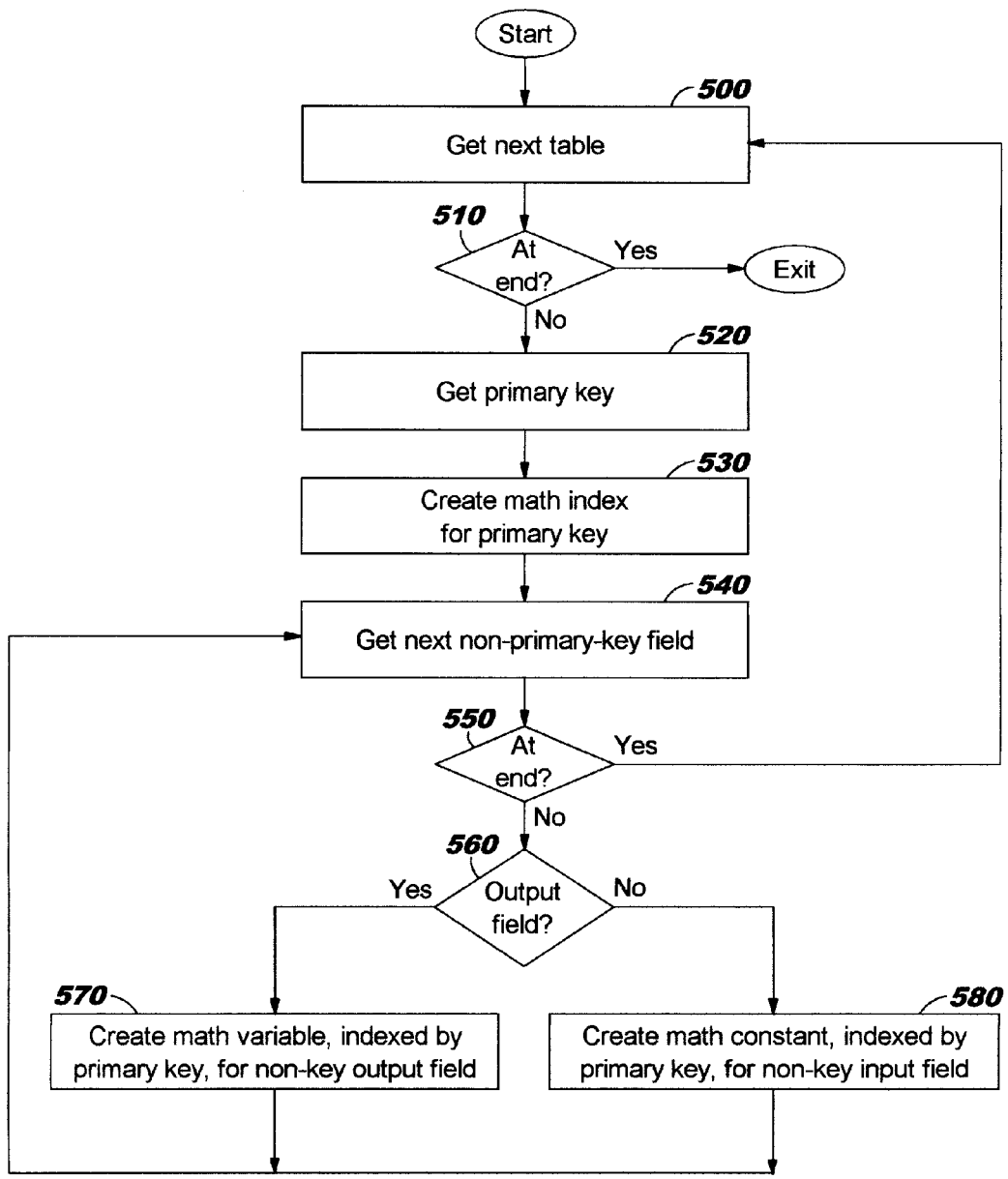

Referring again to FIG. 2, a programmatic process of generating definitions for indexes, constants, and variables is performed at Block 210. This preferably comprises transforming each primary key into a mathematical index, transforming each input field (i.e, input column) into a mathematical constant, and transforming each output field (i.e., output column) into a mathematical variable. A flowchart depicting logic which may be used when implementing the processing of Block 210 is presented in FIG. 5, and will now be described.

Block 500 obtains the next table from the data dictionary. If there are no more tables to process, then the "At end?" test at Block 510 has a positive result, and control exits from FIG. 5. Otherwise, the processing of the obtained table is performed according to Blocks 520-580.

Block 520 obtains the primary key for this table. A mathematical index is created to correspond to this primary key at Block 530. This mathematical index is defined to have the same name and the same type as the primary key. With reference to the data model 300 of FIG. 3, for example, a mathematical index with name "AlloyID" is created when processing table 330, and this index is of type "CHAR(10)". Note that some tables, such as table 310 of FIG. 3, use a primary key that is composed of multiple fields. Accordingly, the mathematical index created to correspond to these primary keys is a tuple containing the same number of fields, of the same type, as the primary key. The index created when processing table 310, for example, is "AlloyID, MetalID", with corresponding compound type CHAR(10), CHAR(10).

Block 540 obtains the next non-primary-key field (i.e., the field corresponding to the next column) for this table. If there are no more such fields, then the "At end?" test at Block 550 has a positive result, and control will therefore transfer back to Block 500 to begin processing another table. Otherwise, when the test at Block 550 has a negative result, processing of the current table continues at Block 560 by testing whether this field is marked or annotated (as discussed above with reference to Block 200 of FIG. 2) as an output field. If so, then Block 570 creates a mathematical variable, indexed by the primary key of the current table (i.e., the primary key of the table in which the output field is defined), to correspond to this output field. This mathematical variable is defined to have the same name and the same type as the output field. With reference to the data model 300 of FIG. 3, for example, a mathematical variable with name "PercentageToInject(AlloyID)" is created when processing Alloy table 330 (and in the example, this is the only output field of the data model), and this variable is of type "DOUBLE". Following the processing at Block 570, control returns to Block 540 to obtain the next non-primary-key field for the current table.

When the test at Block 560 has a negative result, then the current field is not marked as an output field. Accordingly, Block 580 creates a mathematical constant, indexed by the primary key of the current table, to correspond to this field (and note that this field is an input field). This mathematical constant is defined to have the same name and the same type as the input field. With reference to the data model 300 of FIG. 3, for example, an indexed constant with name "CostPerKg(AlloyID)" is created when processing Alloy table 330, and this constant is of type "DOUBLE". When processing Metal table 350 of the example, an indexed constant with name "PercentageToBuild(MetalID)" is created, and this constant is of type "DOUBLE". An indexed constant named "Percentage(AlloyID, MetalID)" is created when processing IsComposedOf table 310, and this constant is also of type "DOUBLE". Following the processing at Block 580, control returns to Block 540 to obtain the next non-primary-key field for the current table.

Figure 6:
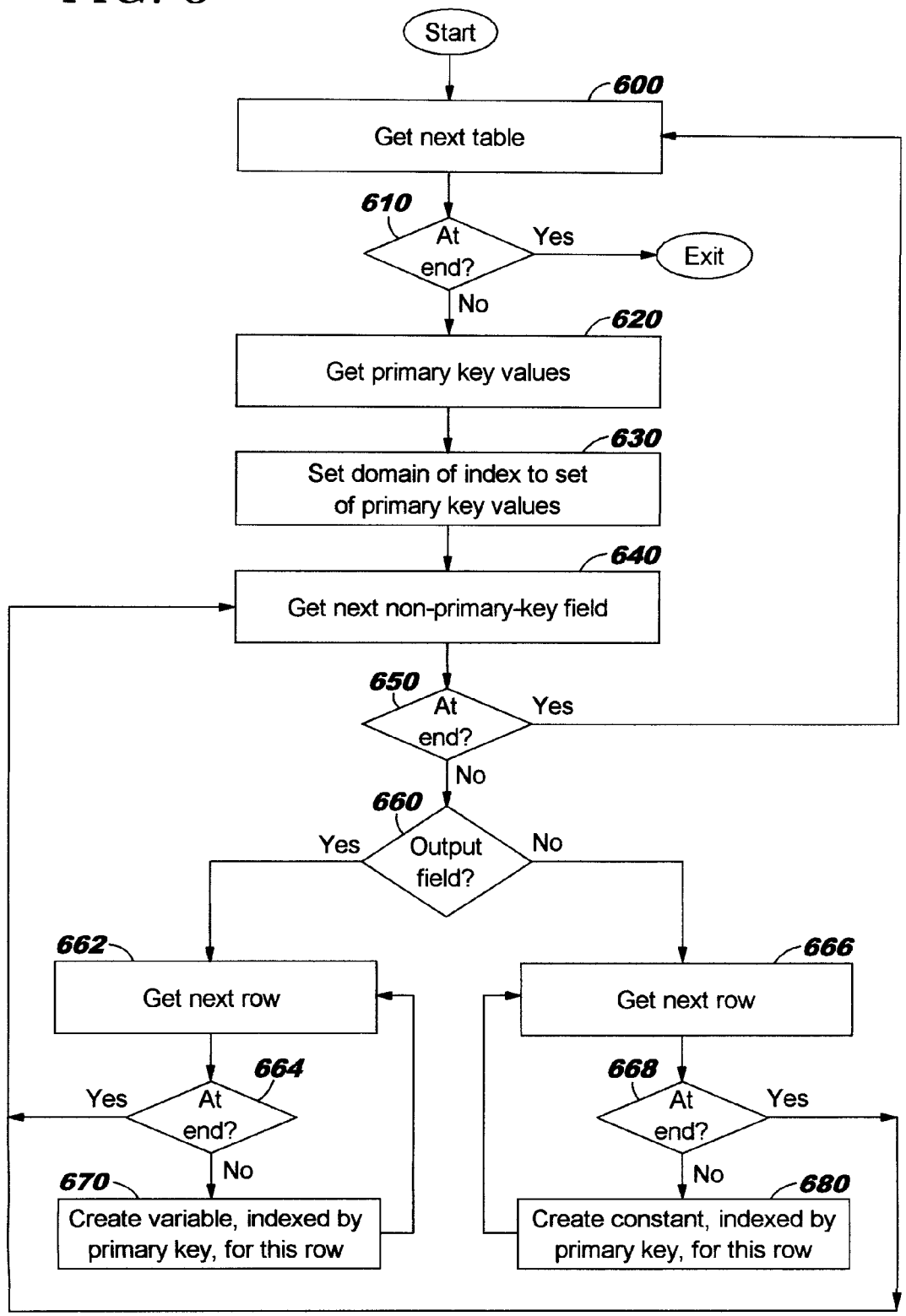

Referring again to FIG. 2, a programmatic process of generating instances for the indexes, constants, and variables is performed at Block 220. This preferably comprises deducing information from the data values that are stored in the data model. A flowchart depicting logic which may be used when implementing the processing of Block 220 is presented in FIG. 6, and will now be described.

Block 600 obtains the next table from the data dictionary. If there are no more tables to process, then the "At end?" test at Block 610 has a positive result, and control exits from FIG. 6. Otherwise, the processing of the obtained table is performed according to Blocks 620-680.

Block 620 obtains the primary key value from each of the rows of this table. At Block 630, this set of values is then used as the domain of possible values for the index created at Block 530. With reference to the Alloy table 400 of FIG. 4A, for example, the mathematical index with name "AlloyID" can take any of the values from the set {A, B, C, D, E, F, G, H, I}, where this set represents the alloy identifiers used as primary key values in table 400. When processing the Metal table 420 of FIG. 4B, as another example, the mathematical index with name "MetalID" can take any of the values from the set {Lead, Zinc, Tin}, where this set represents the metal identifiers used as primary key values in table 420.

Block 640 obtains the next non-primary-key field (i.e., the field corresponding to the next column) for this table. If there are no more such fields, then the "At end?" test at Block 650 has a positive result, and control will therefore transfer back to Block 600 to begin processing another table. Otherwise, when the test at Block 650 has a negative result, processing of the current table continues at Block 660 by testing whether this field was annotated (e.g., according to Block 200 of FIG. 2) as an output field. If so, then processing continues at Block 662, and if not, processing continues at Block 666.

Block 662 obtains the next row from the current table. Block 664 tests whether the rows of this table are at an end (that is, in terms of the processing of the current column). If so, then all of the values for the current output field have been processed, and control therefore returns to Block 640 to get the next non-primary-key field of the current table. Otherwise (i.e., when the test at Block 664 has a negative result), the obtained row is processed at Block 670 by creating a variable instance, indexed by the primary key of the current table, for this row. Each of these variable instances has the same type as the corresponding output field. Following the processing at Block 670, control returns to Block 662 to obtain the next row to be processed from the current table.

With reference to the Alloy table 400 of FIG. 4A, for example, 9 indexed variable instances are created by the iterative processing of Blocks 662, 664, 670, where these 9 variable instances correspond to output values to be obtained for each of the 9 rows in this table. List 460 of FIG. 4D presents one syntax that may be used for generating variable instances, in view of the Alloy table 330 of the sample data model 300 and the sample data values (that is, "A" through "I") in table 400 of FIG. 4A. In this syntax, the variable name "PercentageToInject" is derived (at Block 570 of FIG. 5) from the name of the output field, and indexes "A" through "I" are used when creating instances of this variable at Block 670 to represent each of the alloy identifiers "A" through "I". As one alternative to the "PercentageToInject (A)", . . . "PercentageToInject(I)" syntax shown in FIG. 4D, the variable name might be prepended with a character or characters chosen to convey that the name represents an output variable. For example, the names of the 9 indexed variables might alternatively be generated as follows: "X_PercentagetoInject(A)", "X_PercentagetoInject(B)", "X_PercentagetoInject(C)", "X_PercentagetoInject(D)", "X_PercentagetoInject(E)", "X_PercentagetoInject(F)", "X_PercentagetoInject(G)", "X_PercentagetoInject(H)", and "X_PercentagetoInject(I)". Note that each of the variable instances is of type "DOUBLE" in the example scenario.

When the test at Block 660 has a negative result, then the current field is not marked as an output field. Accordingly, it is an input field, and Block 666 begins the processing of this field by obtaining the next row from the current table. Block 668 tests whether the rows of this table are at an end. If so, then all of the values for the current input field have been processed, and control therefore returns to Block 640 to get the next non-primary-key field of the current table. Otherwise (i.e., when the test at Block 668 has a negative result), the obtained row is processed at Block 680 by creating a constant instance, indexed by the primary key of the current table, for this row. Each of these constant instances has the same type as the corresponding input field. Following the processing at Block 680, control returns to Block 666 to obtain the next row to be processed from the current table.

With reference to the Alloy table 400 of FIG. 4A, for example, 9 indexed constant instances are created by the iterative processing of Blocks 666, 668, 680, where these 9 constant instances correspond to the 9 rows of data in the table. List 470 in FIG. 4E presents one syntax that may be used, in view of the Alloy table 330 of the sample data model 300 and the sample data values in table 400 of FIG. 4A. In this syntax, the variable name "CostPerKg" is derived (at Block 580 of FIG. 5) from the name of the non-primary-key input field, and indexes "A" through "I" are used when creating instances at Block 670 to represent each of the alloy identifiers "A" through "I". Each of these constants is of type "DOUBLE" in this example. In a similar manner, 3 indexed constant instances are created from processing the Metal table 350 with the sample data values in table 420 of FIG. 4B, and these 3 indexed constant instances are shown in list 480 of FIG. 4F, and these constants are of type "DOUBLE". When processing the IsComposedOf table 310 of FIG. 3, 27 indexed constant instances will be created. List 490 of FIG. 4G represents these 27 instances, which are also of type "DOUBLE". (While not all 27 constant instances are shown in FIG. 4G, it will be obvious in view of the teachings herein how the remaining constant instances are created from the rows shown in table 440 of FIG. 4C.)

Figure 7:
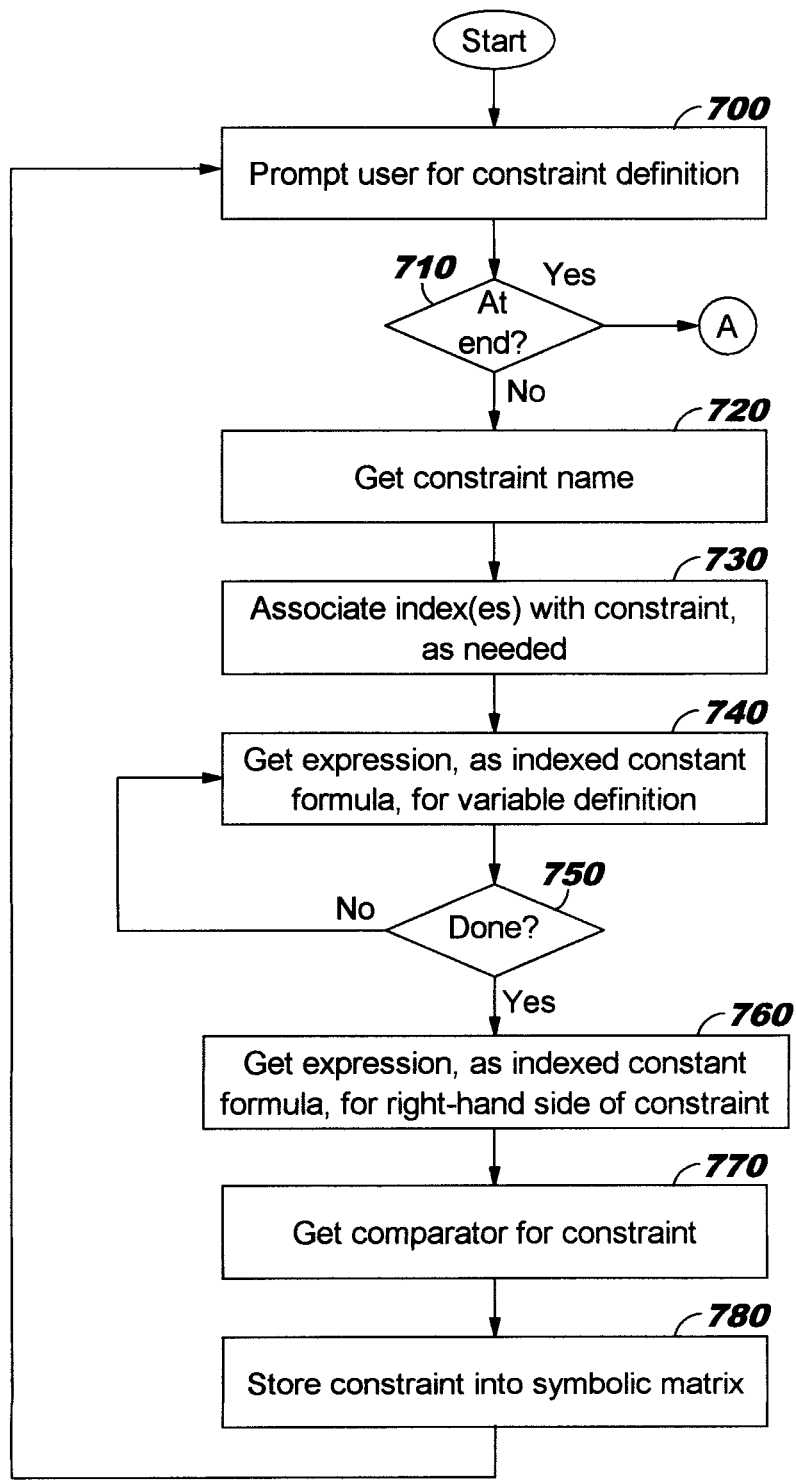
Figure 7:
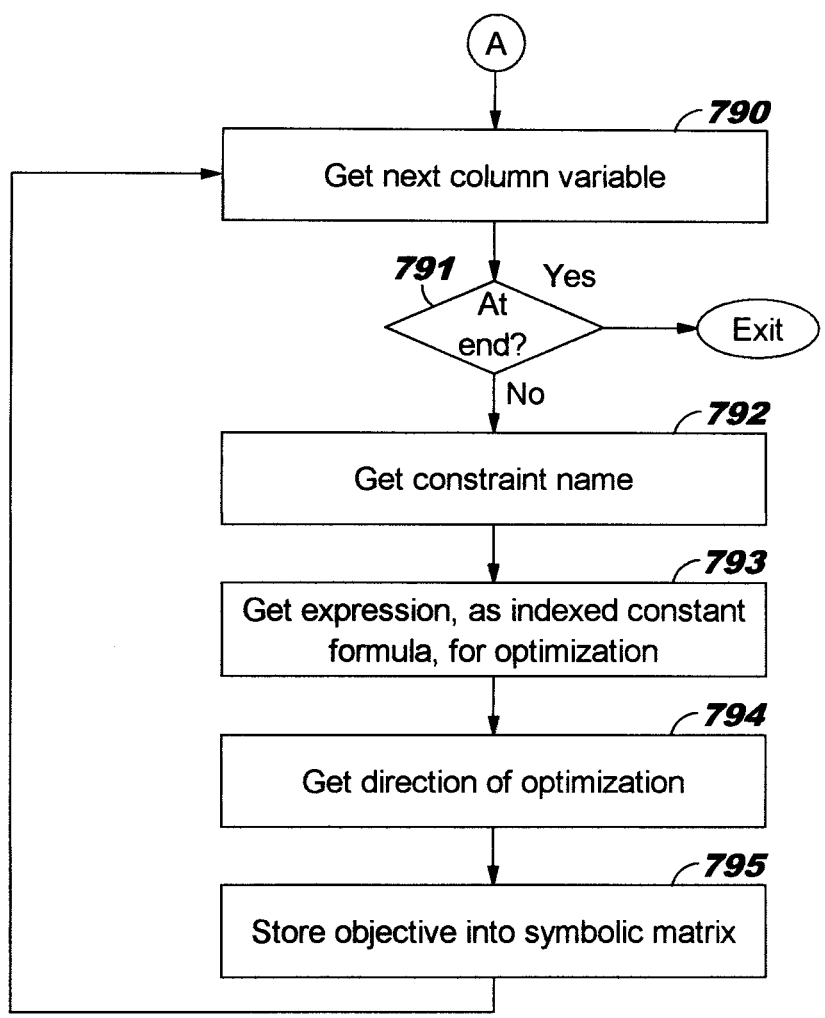

Referring again to FIG. 2, a symbolic matrix is created at Block 230. Preferably, the user supplies information for this task, in view of his or her knowledge of the problem domain, through a graphical user interface or tool (by way of illustration only) that prompts the user for the appropriate input. In particular, the user preferably identifies one or more constraints which are to be applied during the processing of the optimization. A symbolic matrix is disclosed herein as a way to allow the user to more easily express constraints, as compared to known techniques (which typically require the user to provide constraint expressions using complex mathematical syntax). Creating the symbolic matrix preferably comprises labeling the columns of the symbolic matrix with variable definitions, adding a column for holding a right-hand side (referred to herein as "RHS") of the constraint, adding a column for holding a comparator used in the constraint (e.g., an "equal" or a "not equal" comparator), and labeling the rows of the symbolic matrix with constraint names of constraints that are entered into cells of the symbolic matrix (including a special type of constraint that represents the solution of the optimization). Preferably, the well-known Einstein notation is used in the constraint definitions. According to an embodiment of the present invention, variables used in the objective function are summed on all variable indexes (and not on the indexes from the constraints), and the variables are weighted according to (i.e., the variables are multiplied by) the indexed constant specified in the cell that intersects the constraint row and the variable column. A flowchart presenting logic which may be used when implementing the processing of Block 230 is presented in FIG. 7, and may serve as the basis for creating the above-noted graphical user interface or tool that assists the user with constraint entry. The processing shown in FIG. 7 will now be described, followed by a discussion of two examples that illustrate how this processing may operate in the sample scenario.

Block 700 prompts the user for a constraint definition. If there are no more constraint definitions to provide, then the "At end" test at Block 710 has a positive result, and the processing of FIG. 7 transfers to Block 790 for entry of a special type of constraint that represents the objective function (as discussed in more detail below, following a discussion of two sample constraint definitions). Otherwise, processing continues at Block 720.

The user is prompted to provide a name for identifying this constraint (Block 720). In an alternative approach, constraint names may be programmatically generated without relying on user input. One or more indexes are associated with the constraint (Block 730), as necessary. For each output variable (as represented by a column of the symbolic matrix) for which the user wants a non-zero term included in this constraint definition, the user enters an expression, preferably as an indexed constant formula (Block 740). If the final term has been entered for defining the left-hand side of the constraint, then the "Done?" test at Block 750 has a positive result, and processing continues at Block 760 to form the remaining portions of the constraint. Otherwise, when the test at Block 750 has a negative result, control returns to Block 740 to obtain an additional term for use in the constraint.

The user enters an expression, preferably as an indexed constant formula, for the right-hand side of the constraint expression (Block 760), as well as a comparator (Block 770) to be used for comparing the left-hand side of the constraint to the right-hand side. The constraint definition is then stored (Block 780) in the symbolic matrix, after which control returns to Block 700 to obtain the next constraint definition.

As a first example constraint for the sample scenario, suppose the user defines a constraint named "PC" to specify that the percent of contribution from each existing alloy is summed, and that the total must equal 100 percent. Accordingly, Block 720 comprises entry of the constraint name "PC". See reference number 820 of FIG. 8, where the constraint name is entered into the first row of the example symbolic matrix 800. Block 730 does not apply an index to this constraint name because the sum to be constrained is an integer (i.e., 100 percent or 1.0), not an indexed value.

An expression for computing the total sum, over the contribution from each of the 9 alloys of the example, according to this constraint is as follows:

$$\Sigma(\text{AlloyID}) \text{ PercentageToInject(AlloyID)}=100$$

where $\Sigma(\text{AlloyID})$ represents "the sum over all AlloyID values".

According to an embodiment of the present invention, a column definition in the symbolic matrix corresponds to each variable of the objective function. In the example, the variable "PercentageToInject(AlloyID)" is therefore presented as a column of symbolic matrix 800. See reference number 810 of FIG. 8. Because the sample constraint "PC" relies only on this variable term from column 810 and its existing index, Block 740 comprises obtaining a constant multiplier of 1 for a weight to use with this term. The left-hand side of the constraint is therefore reflected in the symbolic matrix 800 by entering a 1 into cell 821.

In this first sample constraint, the indexed variable term is the only term needed for the left-hand side of this particular constraint, and thus Block 750 has a positive result on the first iteration. The right-hand side for this constraint reflects the "100 percent" requirement, as shown at reference number 823 in FIG. 8 as the constant value 1, and in the example, is used with a comparator of "=" as shown at reference number 822.

As a second example constraint for the sample scenario, suppose the user defines a constraint named "CA" to specify the required amount of each underlying metal in the new alloy. By way of review, as shown by the sample data in the Metal table 420 of FIG. 4B, the required percentages of metals in the new alloy are 30 percent lead, 30 percent zinc, and 40 percent tin. Because the output variable term in column 810 does not include MetalID as an index, constraint "CA" needs to be indexed by MetalID in order to represent each of the metals. Block 730 therefore associates the index "MetalID" with constraint name "CA", resulting in the indexed constraint name "CA(MetalID)" as shown at reference number 830 of FIG. 8. An expression for computing the total percentage of each metal in the new alloy, over the contribution from each of the 9 alloys of the example, is as follows:

$$\Sigma(\text{MetalID}) \text{ Percentage(AlloyID, MetalID)} \times \text{PercentageToInject(AlloyID)}=\text{PercentageToBuild(MetalID)}$$

where $\Sigma(\text{MetalID})$ represents "the sum over all MetalID values".

In other words, in one iteration, the constraint "CA(MetalID)" represents the sum computed for lead (i.e., the amount of lead in the new alloy, resulting from the lead contribution of each of the 9 existing alloys); the sum computed for zinc in another iteration; and the sum computed for tin in yet another iteration. The indexed constant expression obtained at Block 740 is therefore shown at reference number 831 as Percentage(AlloyID, MetalID), indicating that the term varies in 2 indexes—that is, the contribution is computed over all the values of AlloyID, and over all the values of MetalID. This is the only term needed for the left-hand side of this particular constraint, and thus Block 750 has a positive result on the first iteration. The right-hand side for this constraint reflects the required contribution, for each metal, as specified in the Metal table 350 (see the values in table 420 of FIG. 4B), and is therefore shown at reference number 833 in FIG. 8 as the value "PercentageToBuild(MetalID)". In the example, the left-hand and right-hand side of this constraint are compared using a comparator of "=" as shown at reference number 832.

Note that the indexes used at Blocks 740 and 760 must be selected from indexes that are applicable to the particular cell of the symbolic matrix, according to the definition of the variable for the column and the constraint for the row. This requirement for selecting indexes may be represented as follows:

IndexSet(Column)∪IndexSet(Row)

In other words, the indexes are chosen from the union of valid indexes for the column and valid indexes for the row. Thus, in the example, any entry in column 810 may use "AlloyID" as an index, and an entry in row 830 may use "MetalID" as an index.

Once the user has defined constraints as illustrated by the two examples presented above, the test at Block 710 has a positive result, and control reaches Block 790 to begin entry of a special constraint type that represents the objective function. Using this special constraint type, a row is generated and added to the symbolic matrix, preferably following the rows generated for other constraints. The next column variable (i.e., output variable) is obtained (Block 790). If there are no more column variables, then the "At end?" test at Block 791 has a positive result, and the processing of FIG. 7 exits. Otherwise, entry of the special constraint begins at Block 792, where a name for this special constraint is obtained. The name may be provided by the user, or may be generated programmatically, to identify this row. In the example symbolic matrix 800, the name "COST" is used for the special constraint, as shown at reference number 840. The user enters an expression for the optimization of this variable, preferably as an indexed constant formula (Block 793). The user then enters the direction of optimization (Block 794). The user may be presented with checkboxes or radio buttons, for example, for selecting the direction as either MIN or MAX. The entered information is then entered into the row of the symbolic matrix (Block 795). See reference number 841, where the expression "CostPerKg(AlloyID)" isshown as the expression used for optimization in the example scenario (as entered, in this example, at Block 793), and reference number 843, which indicates by the notation "(MIN)" that the expression specified in the cell at 841 is to be minimized (as selected by the user at Block 794). Presenting the "CostPerKg(AlloyID)" indexed constant in the column labeled "PercentageToInject(AlloyID)" with "(MIN)" in the RHS column of row 840 indicates, for this example, that the objective function will compute the percentage to inject, for each alloy as a value of the parameter "AlloyID", in view of minimizing the cost per kilogram over all of the existing alloys as a value of the parameter "AlloyID".

Note that a comparator is not used in the special constraint type that represents the objective function. Note also that the constraint name is not an indexed value, and an index is not used in the RHS of this row. That is, rather than allowing indexes for cells of this row to be chosen from the union of indexes for the column and row, as discussed above for other constraints, an embodiment of the present invention assumes that the indexes which may be used for the name of this special constraint, and in the RHS column, are null. This may be represented as follows:

IndexSet(RHS)=IndexSet(Objective)=Ø (i.e., the empty set)

Referring again to FIG. 2, Block 240 programmatically generates a concrete MIP matrix instance from the symbolic matrix, in view of data values of the data model. This preferably comprises defining the MIP matrix by labeling the columns with variable instances, labeling the rows with constraint instances, defining cells as the coefficients of the MIP matrix, providing a column for holding the right-hand side of the constraints and a column for holding the comparator used in the constraints, and adding a row for the objective function. The row for the objective function contains the direction of the objective function—i.e., minimize or maximize. A flowchart presenting logic which may be used when implementing the processing of Block 240 is presented in FIG. 9, and will now be described.

Block 900 gets the next cell to process from the symbolic matrix. If all of the cells have already been processed, then the "At end?" test at Block 910 has a positive result, and the processing of FIG. 9 ends. Otherwise, processing continues at Block 920.

Block 920 determines a value "IndexSet(cell)", which is the set of index values applicable to the current cell, as the union of the index values for the row and column in which this cell appears in the symbolic matrix. This may be represented as follows:

IndexSet(cell)=IndexSet(Column)∪IndexSet(Row)

As noted above with reference to FIG. 7, however, the following assumption is made for cells of the row which corresponds to the special constraint for the objective function:

IndexSet(RHS)=IndexSet(Objective)=Ø (i.e., the empty set)

So, for example, the index set computed for cells 821 and 841 of the example symbolic matrix 800 of FIG. 8 is {(AlloyID)}, the index set computed for cell 831 is {(AlloyID), (MetalID)}, and the index set computed for cell 833 is {(MetalID)}.

Block 930 then asserts that the IndexSet(coefficient expression) value is included in IndexSet(cell).

For example, the coefficient expression for cell 821 is 1 and thus Block 930 asserts that the index set for the sum over all AlloyID values {A, B, C, D, E, F, G, I} is included in the IndexSet {A, B, C, D, E, F, G, I}.

With reference to cell 831, as another example, Block 930 asserts that the index set for the coefficient is included in the IndexSet {AlloyID, MetalID}.

Block 940 identifies the tables on which to iterate in order to generate the set of all needed index tuple values for IndexSet(cell). Note that these are the tables that store the constants involved in the expression for this cell. As an example, Block 940 identifies table 400 of FIG. 4A as the table that stores the constants {A, B, C, D, E, F, G, I} used as index values for cell 821. As another example, Block 940 identifies table 400 as storing these same constants for use as index values in cell 831, and also identifies table 420 of FIG. 4B as storing the constants {Lead, Zinc, Tin} which are also used as index values in this cell. As yet another example, Block 940 identifies table 420 of FIG. 4B as storing the constants {Lead, Zinc, Tin} which are also used as index values in cell 833.

Block 950 creates a new table, "T", as the join of the tables identified at Block 940 with an additional column, "C", which is added thereto for evaluating the cell expression.

Block 960 gets the next row from table "T". If there are no more rows, then the "At end?" test at Block 970 has a positive result, and control therefore transfers back to Block 900 to begin processing another cell from the symbolic matrix. Otherwise, when the test at Block 970 has a negative result, then Block 980 adds a coefficient "Coeff", as indexed by the current values of IndexSet(cell), for the corresponding row and column of the MIP matrix. Control then returns to Block 960 to get the next row from table "T".

Figure 9:
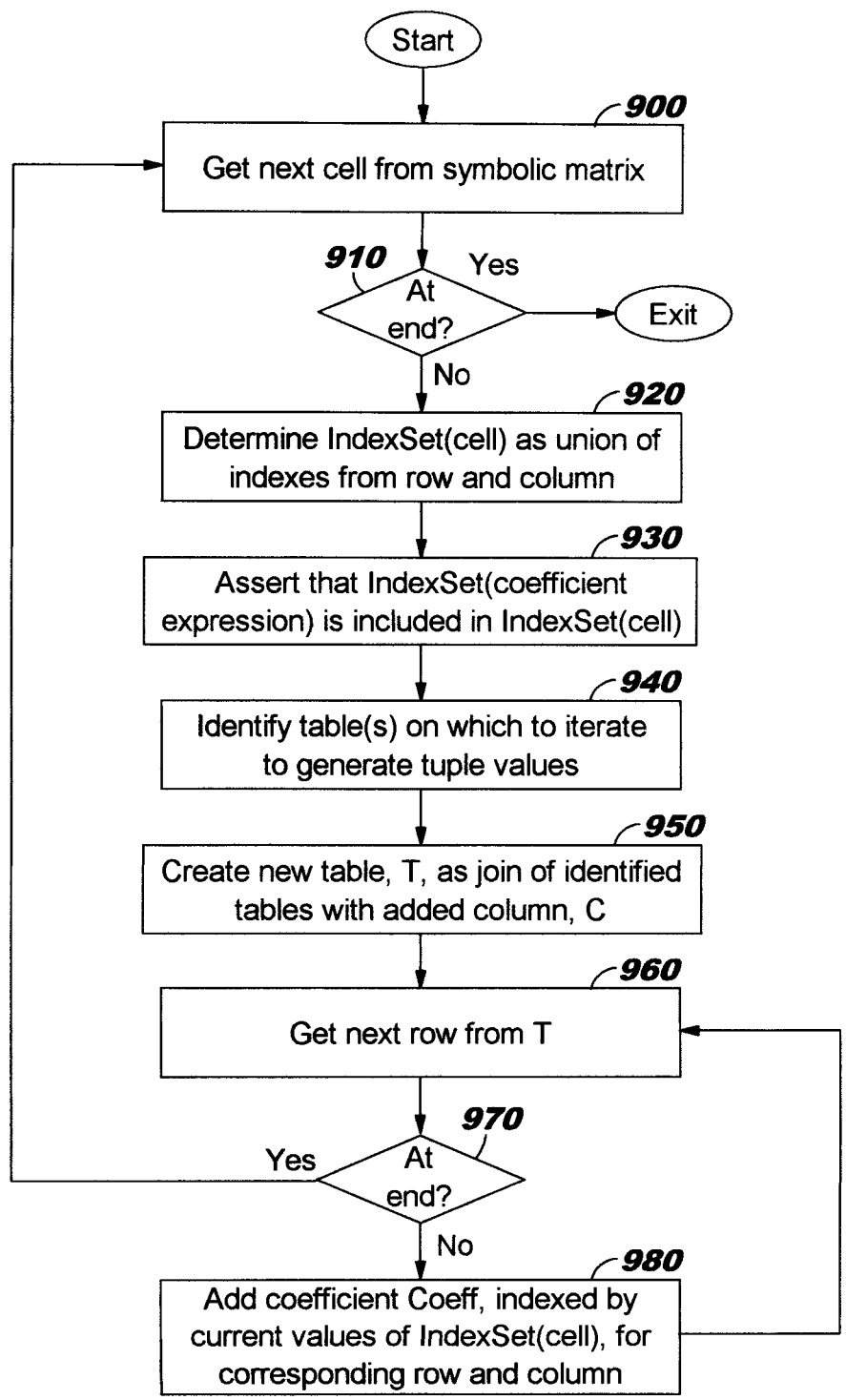

FIG. 10 presents a sample MIP matrix 1000 to illustrate the processing of FIG. 9. As shown therein, the MIP matrix 1000 includes 9 columns representing the 9 existing alloys, where each column reflects indexing of the output variable PercentageToInject by the values of IndexSet={A, B, C, D, E, F, G, H, I}—that is, columns for PercentageToInject(A) through PercentageToInject(I)—and an added column RHS. MIP matrix 1000 further includes 5 rows, where the first row 1001 corresponds to the first sample constraint 820, the next 3 rows 1002-1004 correspond to the second sample constraint 830 as indexed by the values of IndexSet={Lead, Zinc, Tin}, and the final row 1005 corresponds to the objective function. As can be seen from this example, the MIP matrix effectively represents an expansion of the columns containing indexed variable expressions in the symbolic matrix (where the MIP matrix now contains a column for each possible value of the index used in that variable expression) and an expansion of the rows containing indexed constant expressions in the symbolic matrix (where the MIP matrix now contains a row for each possible value of the index used in that constant expression). So, with reference to the example data, column 1010 provides data values corresponding to existing alloy "A", column 1020 provides data values corresponding to existing alloy "B", and so forth.

Figure 11:
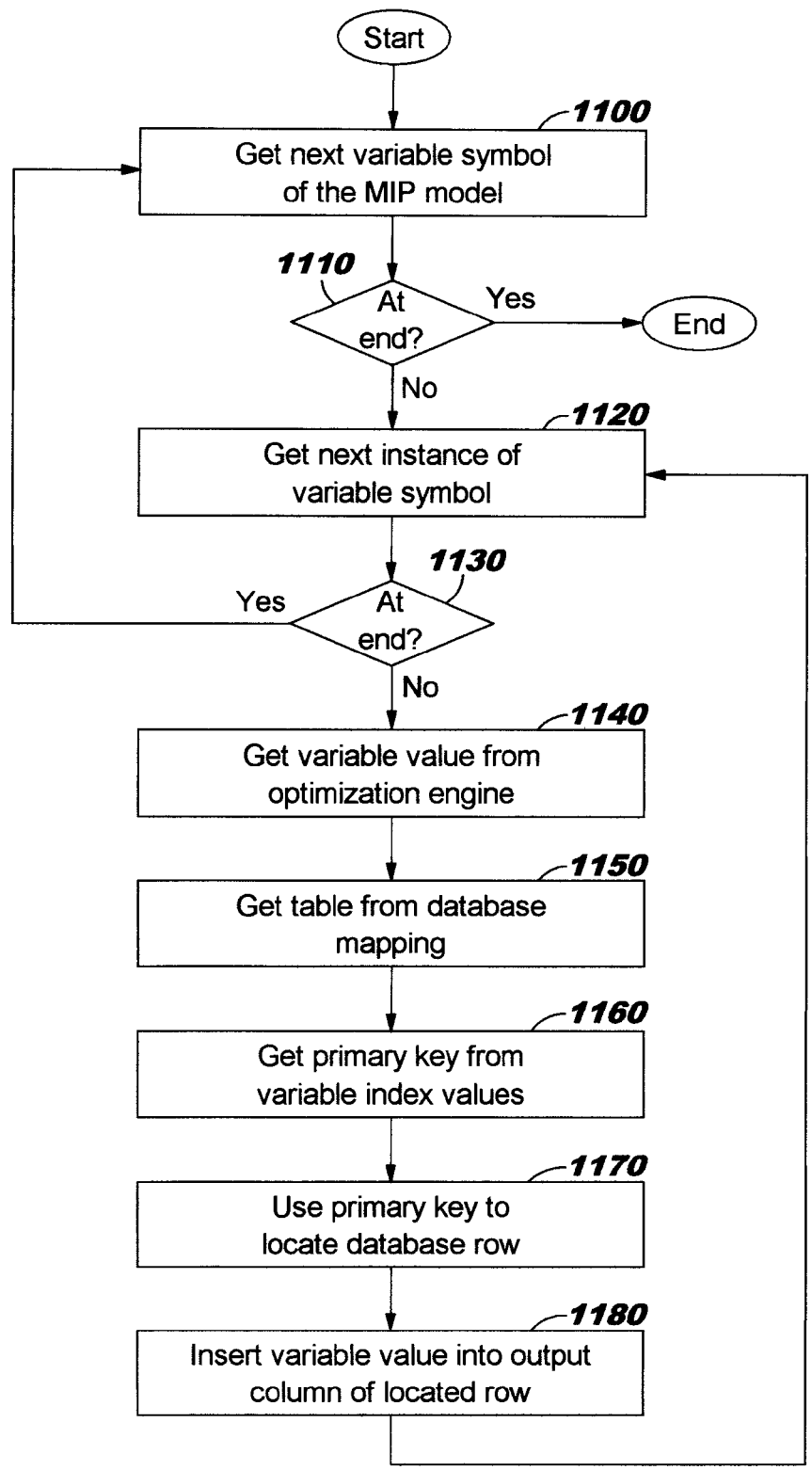

Referring again to FIG. 2, the MIP matrix generated at Block 240 is fed to a MIP solver (Block 250) to solve the optimization problem under the specified constraints. A commercially-available MIP solver is used, according to a preferred embodiment of the present invention, and the internal workings of such MIP solver are therefore not discussed herein. The results of solving the optimization are obtained and fed back to the database at Block 260. This preferably comprises an automated technique for locating the appropriate table(s) of the database, and updating each row for each output field of the table(s) with corresponding optimization results. A flowchart presenting logic which may be used when implementing the processing of Block 260 is presented in FIG. 11, and will now be described.

Block 1100 obtains the next variable symbol in the MIP model. In the example, a single variable PercentageToInject is defined in the MIP model, although some optimization problems may use multiple variables. If there are no more variable symbols to process, then the "At end?" test at Block 1110 has a positive result, and control exits from FIG. 11. Otherwise, the processing of the obtained variable symbol is performed according to Blocks 1120-1180.

Block 1120 obtains the next instance of the variable symbol. In the example, this corresponds to iteratively selecting PercentageToInject(A) on the first iteration of FIG. 11, then PercentageToInject(B) on the second iteration, and so forth. If there are no more such instances, then the "At end?" test at Block 1130 has a positive result, and control will therefore transfer back to Block 1100 to begin processing another variable symbol. Otherwise, when the test at Block 1130 has a negative result, processing of the current variable symbol continues at Block 1140. In the example, the test at Block 1130 has a positive result after PercentageToInject(I) has already been processed by Blocks 1140-1180, and upon returning control to Block 1100, the processing of FIG. 11 will exit because there is only 1 variable symbol to process.

When control reaches Block 1140, a value for the current variable instance is obtained from the optimization engine (i.e., from the output of the MIP solver). When processing the first iteration of FIG. 11, for example, Block 1140 obtains the value of PercentageToInject(A). Block 1150 gets the database table that will store this variable instance, according to a previously-created mapping between fields and tables. (Refer to the discussion of Block 200 of FIG. 2, above, where the user annotates the entity-relationship schema by identifying which table will store output values.) Block 1160 obtains the primary key for this table, using the variable index value, and Block 1170 uses this primary key value to locate the corresponding row in the appropriate database table. When processing the first iteration of FIG. 11, for example, Blocks 1150-1170 comprise determining that "A" is the current primary key value for the Alloy table 400 of FIG. 4A, and locating the row therein which is indexed by "A". Block 1180 inserts the variable value obtained at Block 1140 into the appropriate output column of this located row. Control then returns to Block 1120 to obtain the next instance of the current variable symbol. In the example, this comprises obtaining PercentageToInject(B) on the second iteration of Block 1120, and so forth through all 9 instances of the PercentageToInject output variable.

FIG. 4H shows a revised version 400' of the Alloy table 400, with addition of a column for storing the values of output variable PercentageToInject. When completed, this added column represents the percentage of each of the 9 existing alloys that is to be used in creating a least-cost, per kilogram, new alloy that contains 30 percent lead, 30 percent zinc, and 40 percent tin. In this example, the solution is shown as comprising a 60 percent contribution of the existing alloy B and a 40 percent contribution of the existing alloy D.

As has been demonstrated above, an embodiment of the present invention provides programmatic, automated techniques for preparing a MIP matrix to be solved, based on an annotated entity-relationship data model schema and a symbolic matrix, and for storing output from the solution into a corresponding database. Mathematical indexes, constants, and variable instances may be programmatically generated from any database in the schema. The concept of a symbolic matrix is introduced, where this symbolic matrix allows a user to easily express constraints. The user is no longer required to write code to handle these now-automated processes.

Figure 12:
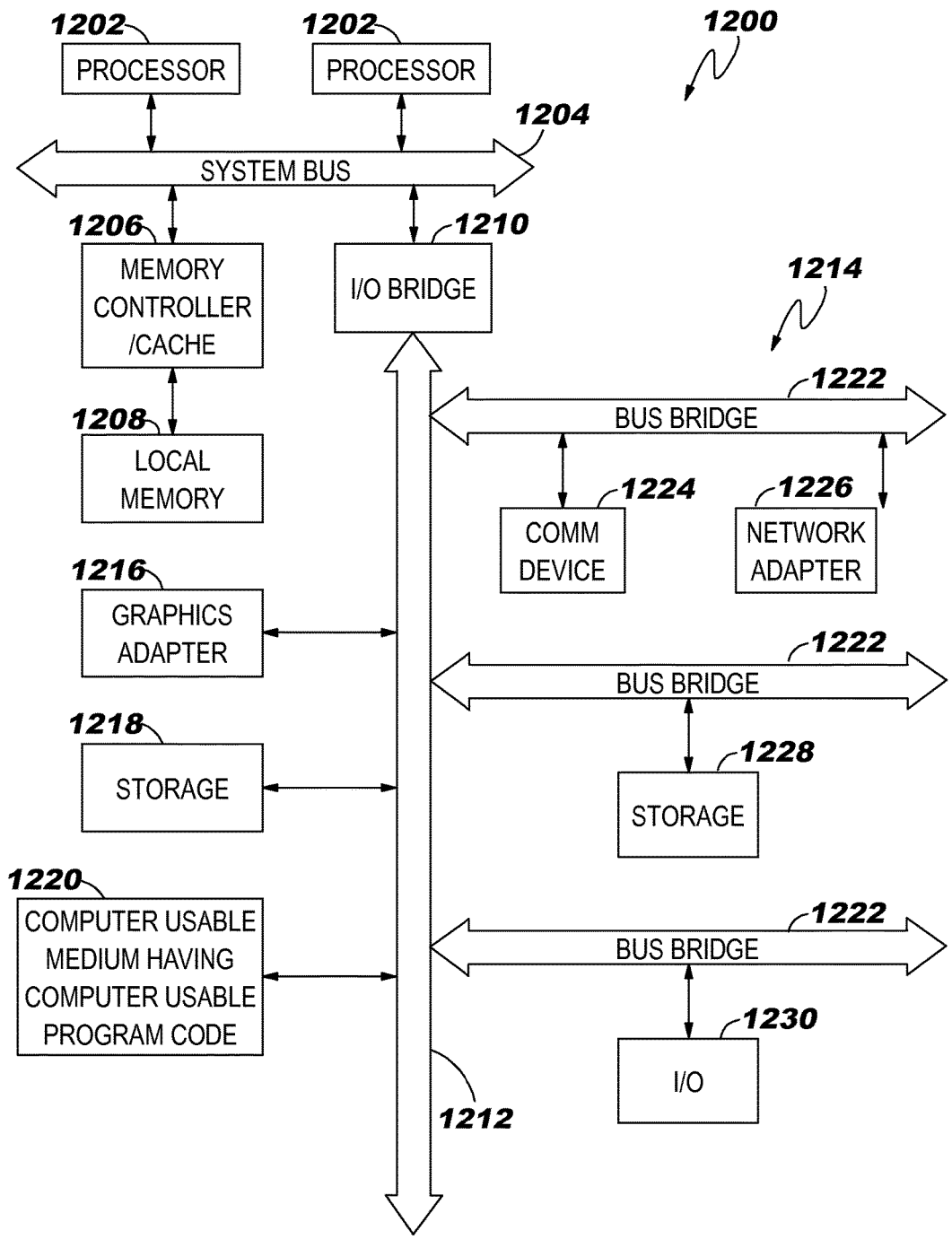
FIG. 12 depicts a data processing system suitable for storing and/or executing program code.

Referring now to FIG. 12, a block diagram of a data processing system is depicted in accordance with the present invention. Data processing system 1200, such as one of the processing devices described herein, may comprise a symmetric multiprocessor ("SMP") system or other configuration including a plurality of processors 1202 connected to system bus 1204. Alternatively, a single processor 1202 may be employed. Also connected to system bus 1204 is memory controller/cache 1206, which provides an interface to local memory 1208. An I/O bridge 1210 is connected to the system bus 1204 and provides an interface to an I/O bus 1212. The I/O bus may be utilized to support one or more buses 1214 and corresponding devices, such as bus bridges 1222, input output devices ("I/O" devices) 1230, storage 1228, communication devices 1224, network adapters 1226, etc. Network adapters may also be coupled to the system to enable the data processing system to become coupled to other data processing systems or remote printers or storage devices through intervening private or public networks.

Also connected to the I/O bus may be devices such as a graphics adapter 1216, storage 1218, and a computer usable storage medium 1220 having computer usable program code embodied thereon. The computer usable program code may be executed to execute any aspect of the present invention, as have been described herein.

The data processing system depicted in FIG. 12 may be, for example, an IBM System p® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both. "Java" is a registered trademark of Sun Microsystems, Inc., in the United States, other countries, or both.)

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including (but not limited to) an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of generating a mixed integer linear programming matrix for solving an optimization of a data model, comprising:
   programmatically generating a constant definition to represent each input field of each of a plurality of tables in an entity-relationship data model schema that represents the data model, the constant definition being indexed by each primary key of the table in which the input field is defined, and programmatically generating, for each value of the primary key, a constant instance indexed by the value;
   programmatically generating a variable definition to represent each output field of each of the tables, the variable definition being indexed by each primary key of the table in which the output field is defined, and programmatically generating, for each value of the primary key, a variable instance indexed by the value;
   programmatically generating a symbolic matrix structure comprising:
      for each indexed variable definition, a column corresponding to the indexed variable definition;
      for each of at least one constraint on an optimization to be solved, a row corresponding to the constraint, each constraint reflecting at least one of the input fields, the constants, or the output fields, at least one of the at least one constraint being an indexed constraint that is indexed by at least one of the output fields;
      a column for storing a comparator used in a selected constraint;

a column for storing a right-hand side of a selected constraint; and a row corresponding to the optimization;

programmatically storing values into cells of the symbolic matrix structure, comprising:

for each row corresponding to a constraint, storing a specified right-hand side of the constraint into a cell where the row intersects the column for storing the right-hand side, storing a specified comparator of the constraint into a cell where the row intersects the column for storing the comparator, and storing a multiplier into a cell where the row intersects the column corresponding to the indexed variable definition, the multiplier for at least one row being an indexed constant; and for the row corresponding to the optimization, storing an objective of the optimization into a cell where the row intersects the column for storing the right-hand side and storing a multiplier into a cell where the row intersects the column corresponding to the indexed variable definition, the multiplier being an indexed constant;

programmatically generating, from the symbolic matrix and the data model, a MIP matrix instance, the symbolic matrix being separate and distinct from the MIP matrix instance and from the data model, further comprising:

expanding each row of the symbolic matrix that corresponds to an indexed constraint to include a row in the MIP matrix instance for each value found in the data model for the constraint index;

expanding each column of the symbolic matrix that corresponds to an indexed variable definition to include a column in the MIP matrix instance for each value found in the data model for the indexed variable; and inputting the MIP matrix instance to a MIP solver to yield the optimization.

2. The method according to claim 1, wherein the yielded optimization comprises a determined value for each of the output fields, and further comprising updating the output fields in the data model using output of the MIP solver.

3. The method according to claim 1, wherein the entity-relationship data model schema is annotated to identify each output field.

4. The method according to claim 1, wherein the optimization comprises one of a minimization or a maximization.

5. A system for generating a mixed integer linear programming matrix for solving an optimization of a data model, comprising:

a computer comprising a processor; and instructions which are executable, using the processor, to implement functions comprising:

programmatically generating a constant definition to represent each input field of each of a plurality of tables in an entity-relationship data model schema that represents the data model, the constant definition being indexed by each primary key of the table in which the input field is defined, and programmatically generating, for each value of the primary key, a constant instance indexed by the value;

programmatically generating a variable definition to represent each output field of each of the tables, the variable definition being indexed by each primary key of the table in which the output field is defined, and programmatically generating, for each value of the primary key, a variable instance indexed by the value;

programmatically generating a symbolic matrix structure comprising:

for each indexed variable definition, a column corresponding to the indexed variable definition;

for each of at least one constraint on an optimization to be solved, a row corresponding to the constraint, each constraint reflecting at least one of the input fields, the constants, or the output fields, at least one of the at least one constraint being an indexed constraint that is indexed by at least one of the output fields;

a column for storing a comparator used in a selected constraint;

a column for storing a right-hand side of a selected constraint; and a row corresponding to the optimization;

programmatically storing values into cells of the symbolic matrix structure, comprising:

for each row corresponding to a constraint, storing a specified right-hand side of the constraint into a cell where the row intersects the column for storing the right-hand side, storing a specified comparator of the constraint into a cell where the row intersects the column for storing the comparator, and storing a multiplier into a cell where the row intersects the column corresponding to the indexed variable definition, the multiplier for at least one row being an indexed constant; and for the row corresponding to the optimization, storing an objective of the optimization into a cell where the row intersects the column for storing the right-hand side and storing a multiplier into a cell where the row intersects the column corresponding to the indexed variable definition, the multiplier being an indexed constant;

programmatically generating, from the symbolic matrix and the data model, a MIP matrix instance, the symbolic matrix being separate and distinct from the MIP matrix instance and from the data model, further comprising:

expanding each row of the symbolic matrix that corresponds to an indexed constraint to include a row in the MIP matrix instance for each value found in the data model for the constraint index;

expanding each column of the symbolic matrix that corresponds to an indexed variable definition to include a column in the MIP matrix instance for each value found in the data model for the indexed variable; and inputting the MIP matrix instance to a MIP solver to yield the optimization.

6. The system according to claim 5, wherein the yielded optimization comprises a determined value for each of the output fields, and wherein the functions further comprise updating the output fields in the data model using output of the MIP solver.

7. The system according to claim 5, wherein the entity-relationship data model schema is annotated to identify each output field.

8. A computer program product for generating a mixed integer linear programming matrix for solving an optimization of a data model, the computer program product comprising:

a non-transitory computer readable storage medium having computer readable program code embodied therein, the computer readable program code configured for:
programmatically generating a constant definition to represent each input field of each of a plurality of tables in an entity-relationship data model schema that represents the data model, the constant definition being indexed by each primary key of the table in which the input field is defined, and programmatically generating, for each value of the primary key, a constant instance indexed by the value;
programmatically generating a variable definition to represent each output field of each of the tables, the variable definition being indexed by each primary key of the table in which the output field is defined, and programmatically generating, for each value of the primary key, a variable instance indexed by the value;
programmatically generating a symbolic matrix structure comprising:
for each indexed variable definition, a column corresponding to the indexed variable definition;
for each of at least one constraint on an optimization to be solved, a row corresponding to the constraint, each constraint reflecting at least one of the input fields, the constants, or the output fields, at least one of the at least one constraint being an indexed constraint that is indexed by at least one of the output fields;
a column for storing a comparator used in a selected constraint;
a column for storing a right-hand side of a selected constraint; and
a row corresponding to the optimization;
programmatically storing values into cells of the symbolic matrix structure, comprising:
for each row corresponding to a constraint, storing a specified right-hand side of the constraint into a cell where the row intersects the column for storing the right-hand side, storing a specified comparator of the constraint into a cell where the row intersects the column for storing the comparator, and storing a multiplier into a cell where the row intersects the column corresponding to the indexed variable definition, the multiplier for at least one row being an indexed constant; and
for the row corresponding to the optimization, storing an objective of the optimization into a cell where the row intersects the column for storing the right-hand side and storing a multiplier into a cell where the row intersects the column corresponding to the indexed variable definition, the multiplier being an indexed constant;
programmatically generating, from the symbolic matrix and the data model, a MIP matrix instance, the symbolic matrix being separate and distinct from the MIP matrix instance and from the data model, further comprising:
expanding each row of the symbolic matrix that corresponds to an indexed constraint to include a row in the MIP matrix instance for each value found in the data model for the constraint index;
expanding each column of the symbolic matrix that corresponds to an indexed variable definition to include a column in the MIP matrix instance for each value found in the data model for the indexed variable; and
inputting g the MIP matrix instance to a MIP solver to yield the optimization.

9. The computer program product according to claim 8, wherein the yielded optimization comprises a determined value for each of the output fields, and wherein the computer readable program code is further configured for updating the output fields in the data model using output of the MIP solver.

10. The computer program product according to claim 8, wherein the entity-relationship data model schema is annotated to identify each output field.

* * * * *